(12) United States Patent
Garnett

(10) Patent No.: US 6,718,472 B1
(45) Date of Patent: Apr. 6, 2004

(54) SYSTEM FOR SUSPENDING POWER TO A FIELD REPLACEABLE UNIT UPON RECEIVING FAULT SIGNAL AND AUTOMATICALLY REAPPLYING POWER THERETO AFTER THE REPLACEMENT UNIT IS SECURED IN POSITION

(75) Inventor: Paul J. Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/416,001

(22) Filed: Oct. 8, 1999

(51) Int. Cl.⁷ .................................................. G06F 1/28
(52) U.S. Cl. .................... 713/300; 713/330; 713/340; 710/10; 710/15; 710/103
(58) Field of Search ...................... 710/103, 10, 15; 347/19, 23, 36; 713/102, 330, 340, 300

(56) References Cited

U.S. PATENT DOCUMENTS

| 6,105,090 | A | * | 8/2000 | Fosmo | 710/103 |
| 6,192,434 | B1 | * | 2/2001 | Wallach et al. | 710/103 |
| 6,227,642 | B1 | * | 5/2001 | Hanabusa et al. | 347/19 |
| 6,363,493 | B1 | * | 3/2002 | Williams | 714/1 |

* cited by examiner

*Primary Examiner*—Thomas Lee
*Assistant Examiner*—Jinsong Hu
(74) *Attorney, Agent, or Firm*—Meyertons Hood Kivlin Kowert & Goetzel, P.C.; B. Noël Kivlin

(57) ABSTRACT

A power sub-system controls a supply of power to a field replaceable unit for electronic equipment. The power sub-system includes a power controller that is arranged, in response to the detection of a fault, to switch off the supply of power to a field replaceable unit. The power controller is then responsive to a sequence of two events to switch on the supply of power to the field replaceable unit. The first event is a first change in state of an interlock signal indicative of the field replaceable unit being released. The second event is a change of state of the interlock signal indicative of a field replaceable unit being secured in position. Automatic power management can thus provided with requiring a maintenance engineer to restore power manually, this being achievable simply by the removal and replacement of the field replaceable unit. The field replaceable unit includes an interlock mechanism for locking the field replaceable unit in the electronic equipment. An interlock switch is operated by the interlock mechanism and causes an interlock signal line to be connected to a source of the predetermined potential when the interlock mechanism locks the field replaceable unit in the electronic equipment. It is changes on the interlock signal line that are detected by the power controller.

32 Claims, 12 Drawing Sheets

SYSTEM FOR SUSPENDING POWER TO A FIELD REPLACEABLE UNIT UPON RECEIVING FAULT SIGNAL AND AUTOMATICALLY REAPPLYING POWER THERETO AFTER THE REPLACEMENT UNIT IS SECURED IN POSITION

BACKGROUND OF THE INVENTION

The invention relates to the monitoring and replacement of field replaceable units (FRUs) for electronic equipment, for example for a telecommunications or other application where high standards are set and where the unit may, for example, be remote from a service center and the replacement may need to be effected by non-skilled personnel.

FRUs can be used in many different systems. They find particular but not exclusive application to computer systems, for example to fault tolerant computer systems where it is desirable to be able readily to replace units which have developed a fault or have been superseded by a more recent version.

Examples of FRUs for such a system can include, for example, a CPU, a PCI card, power supply units (PSUs), a motherboard, or any other system components, One FRU, for example a field replaceable card, can include hardware for implementing several devices (e.g. a multiple Ethernet adapter, or a SCSI adapter with an Ethernet adapter).

It is known to provide FRUs with non-volatile memory (e.g. EEPROMs), which can contain information relating to the FRU. In a known system, FRUs can include basic FRU identification information in the non-volatile memory.

It is also known to provide a system management suite, collectively known as a configuration management system (CMS) which manages the FRUs, other devices and system resources using objects to represent the FRUs, devices and other system resources. An object forms a particular instance of a CMS class, which is defined by a CMS definition (CMSDEF).

For example, a CAF (Console and Fans unit) CMSDEF defines the CAF CMS class of which the object CAF_1 is an instance that represents a particular CAF FRU. The CAF 1 object may have an attribute called LOCATION having the value A. CAF, indicating that the FRU represented by the CAF_1 object has been inserted into location A. CAF in the chassis of the computer system.

In order correctly to manage the FRUs, the CMS requires access to the non-volatile memory in the FRUs. In order to gain access to the non-volatile memory in the FRUs, it is necessary that power is supplied to the FRUs. However, this conflicts with safety requirements relating to telecommunications equipment which require that where a FRU is faulty it necessary to powder down the FRU.

It is known to provide a fuse on a FRU to isolate circuitry of the FRU in the event of an electrical fault. However, in the event of a fault occurring at the interconnections to the FRU, for example in the event of a short circuit between connector pins, the fuse may not protect against this. It would be possible to locate such a fuse in a power supply sub-system of the electronic equipment such that it would also detect faults at the interconnection to the FRU. However, in the event of a fault, it would be necessary for the maintenance engineer to replace or reset the fuse in addition to replacing the FRU.

Accordingly, the present invention seeks to address the powering of a FRU in a manner that can provide protection against faults, while not complicating the tasks required of a maintenance engineer when replacing a faulty FRU.

SUMMARY

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a power sub-system for controlling a supply of power to a FRU for electronic equipment. The power sub-system includes a power controller that is arranged, in response to the detection of a fault, to switch off the supply of power to a FRU. The power sub-system is further operable subsequently, in response to a sequence of two events, to switch on the supply of power to the FRU. The first event is a first change in state of an interlock signal indicative of the FRU being released. The second event is a second change of state of the interlock signal indicative of a FRU being secured in position.

By causing power to be cut on detection of a fault, and then restored after an indication of the FRU being released followed by an indication of a FRU being secured in position, the temporary interruption of power to the FRU location is managed automatically.

An embodiment of the invention thus provides significant advantages over systems where a fuse or other trip device requires a maintenance engineer to replace the fuse of reset the trip manually. The maintenance engineer does not need to perform any actions other than the removal of the FRU and the replacement of that, or another replaceable unit, to restore the power. Accordingly, an embodiment of the invention enhances safety and security during maintenance operations when hot swapping FRUs. Typically, a replacement FRU would be used to replace a faulty FRU that is removed. However, it is also possible that the same FRU could be reused if the fault were replaced, or perhaps a unit on the FRU was reset, or the like.

The provision of the arrangement for controlling the supply of power separate from the FRU means that the power subsystem can detect and address faults associated with the connections between the power sub-system and the FRU (e.g., a short between individual connectors) as well as faults within the FRU itself. An embodiment of the invention thus provides further advantages over an arrangement where a fuse element on the FRU is used to isolate an electrical fault.

In an embodiment of the invention, the power controller includes a logic circuit responsive to a fault signal to switch off the supply of power and responsive to the first and second changes of state of the interlock signal to switch on the supply of power. However, in other embodiments, a suitable programmed microcontroller or microprocessor could be employed to implement the control logic.

A semiconductor switch (e.g., a transistor switch), under the control of the power controller, can provide for switching on and off of the supply of power to a power line to the FRU. A sensor circuit responsive to an overcurrent on the power line can be used to detect an electrical fault of the FRU or a fault in the connections between the power sub-system and the FRU. The logic circuit is connected to the sensor circuit to receive the fault signal therefrom in response to the overcurrent on the power line.

In an embodiment of the invention, an interlock signal line carries an interlock signal when the FRU is locked in the electronic equipment.

The interlock signal is preferably a predetermined potential on the interlock signal line. The first change in state can be the removal of the predetermined potential and the second change of state can be the reinstatement of the predetermined potential. In an embodiment of the invention, the predetermined potential is ground potential.

Debounce logic can be provided between the interlock signal line and power controller for debouncing the interlock signal. This avoids intermittent contact (e.g., due to switch bounce) unintentionally triggering the reinstatement of power following an interruption due to a fault.

In accordance with another aspect of the invention, there is provided electronic equipment including a power subsystem for controlling the supply of power to a FRU, the power subs-system comprising a power controller that is arranged, in response to the detection of a fault, to switch off a supply of power to a FRU; and subsequently, in response to a first change in state of an interlock signal indicative of the FRU being released, followed by a second change of state of the interlock signal indicative of a FRU being secured in position, to switch on the supply of power to the FRU.

The FRU can be a computer system component. The computer system can be a rack-mounted computer system, for example, a fault-tolerant computer system.

In accordance with another aspect of the invention, there is a FRU including an interlock mechanism for locking the FRU in the electronic equipment. An interlock switch is operated by the interlock mechanism and causes an interlock signal line to be connected to a source of the predetermined potential when the interlock mechanism locks the FRU in the electronic equipment.

In this manner, the interlock signal is provided automatically when the FRU is locked in position in the equipment, and is interrupted when the lock is released.

The power sub-system and the FRU comprise co-operating connector arrangements for interconnecting a plurality of power and signal lines of the power sub-system to a corresponding plurality of power and signal lines of the FRU. Among those power and signal lines in the power sub-system and the FRU are a main power line for the supply of power to the FRU, a ground line, and an interlock signal line.

In a particular embodiment of the invention, the FRU is a PCI card carrier assembly. Moreover, the FRU comprises power conversion circuitry for supplying different voltages to a connectable PCI card.

In accordance with yet another aspect of the present invention, there is provided a method of controlling a supply power to a FRU for electronic equipment, the method comprising: in response to the detection of a fault, switching off the supply of power to a FRU; and subsequently, in response to a first change in state of an interlock signal indicative of the FRU being released, followed by a second change of state of the interlock signal indicative of a FRU being secured in position, switching on the supply of power to the FRU.

Thus, in accordance with an embodiment of the invention, a power sub-system controls a supply of power to a FRU for electronic equipment. The power sub-system includes a power controller that is arranged, in response to the detection of a fault, to switch off the supply of power to a FRU. The power controller is then responsive to a sequence of two events to switch on the supply of power to the FRU. The first event is a first change in state of an interlock signal indicative of the FRU being released. The second event is a change of state of the interlock signal indicative of a FRU being secured in position.

An advantage of the invention that should be apparent from the above is the automatic manner in which power can be removed and then reinstated, without specific acts being required of a maintenance engineer other than the mechanical operations that are necessary to remove and replace a FRU. This reduces the time needed to replace the FRU, and avoids further errors as a result of a maintenance engineer failing to restore power to the subsystem as would be necessary if a fuse or a conventional trip were used.

Further objects and advantages of the invention will be apparent from the following description.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
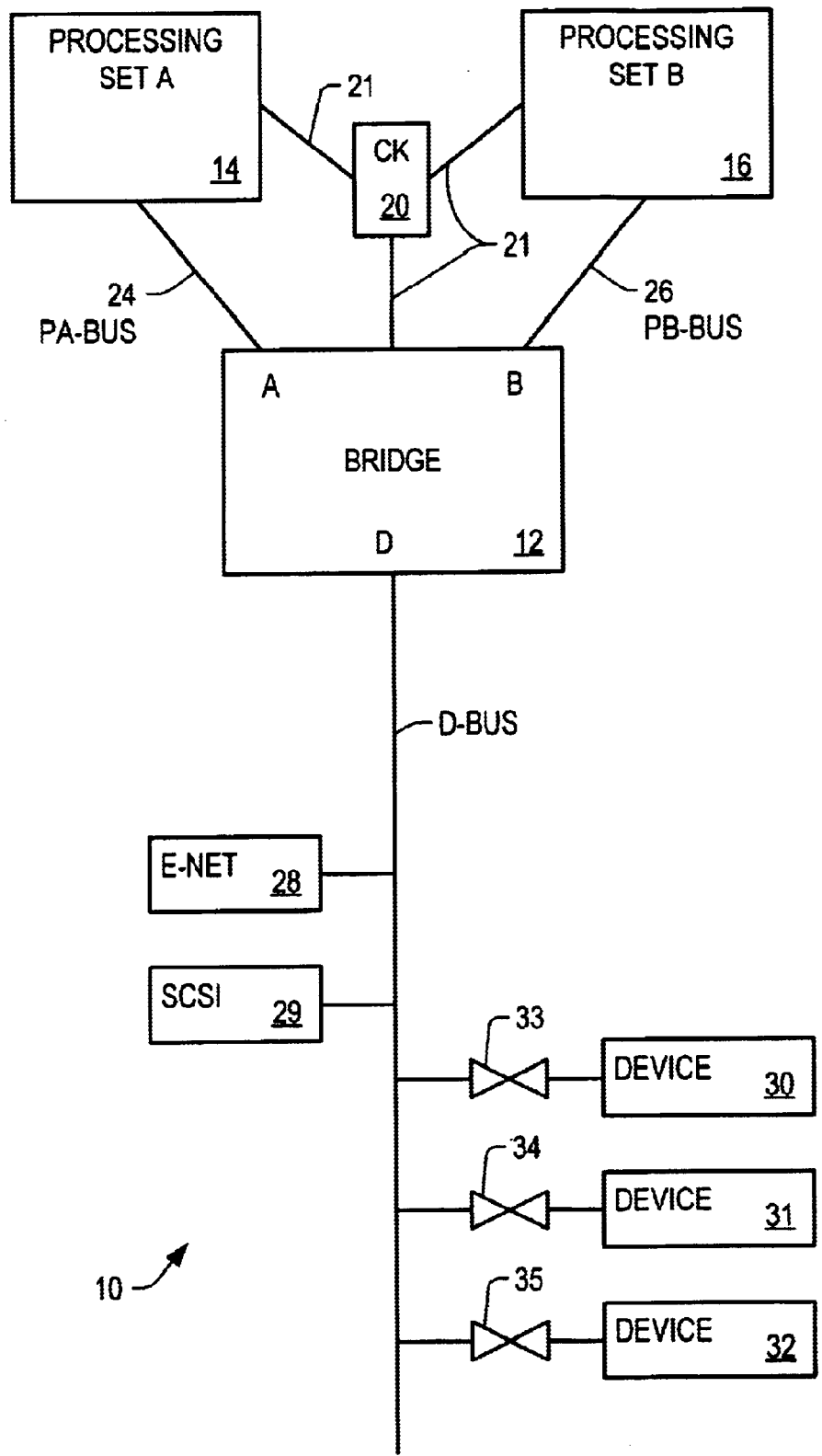
FIG. 1 is an architectural overview of a fault tolerant computer system.

FIG. 1 is a schematic overview of an approach to providing a fault tolerant computing system 10 employing a plurality of processing sets 14 and 16 and a bridge 12. As shown in FIG. 1, there are two processing sets 14 and 16, although there may be three or more processing sets. The bridge 12 forms an interface between the processing sets and I/O devices such as device 28, 29, 30, 31 and 32. In this document, the term "processing set" is used to denote a group of one or more processors, possibly including memory, which output and receive common outputs and inputs. Also, it should be noted that the term "bridge" is used to denote any device, apparatus or arrangement suitable for interconnecting two or more buses of the same or different types.

The first processing set 14 is connected to the bridge 12 via a first processing set I/O bus (PA bus) 24, for example a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, for example a PCI bus.

Outer bus protocols may be used and the D-bus 22 may have a different protocol from that of the PA bus and the PB bus (P buses) 24 and 26.

The processing sets 14 and 16 and the bridge 12 are operable in synchronism under the control of a common clock 20, which is connected thereto by clock signal lines 21.

Some of the devices, including an Ethernet (E-NET) interface 28 and a Small Computer System Interface (SCSI) interface 29, are permanently connected to the device bus 22, but other I/O devices such as I/O devices 30, 31 and 32 can be hot insertable into individual switched slots 33, 34 and 35. Dynamic field effect transistor (FET) switching can be provided for the slots 33, 34 and 35 to enable hot insert ability of the devices such as devices 30, 31 and 32. The provision of the FETs enables an increase in the length of the D bus 22 as only those devices which are active are switched on, reducing the effective total bus length. It will be appreciated that the number of I/O devices which may be connected to the D bus 22, and the number of slots provided for them, can be adjusted according to a particular implementation in accordance with specific design requirements.

Figure 2:
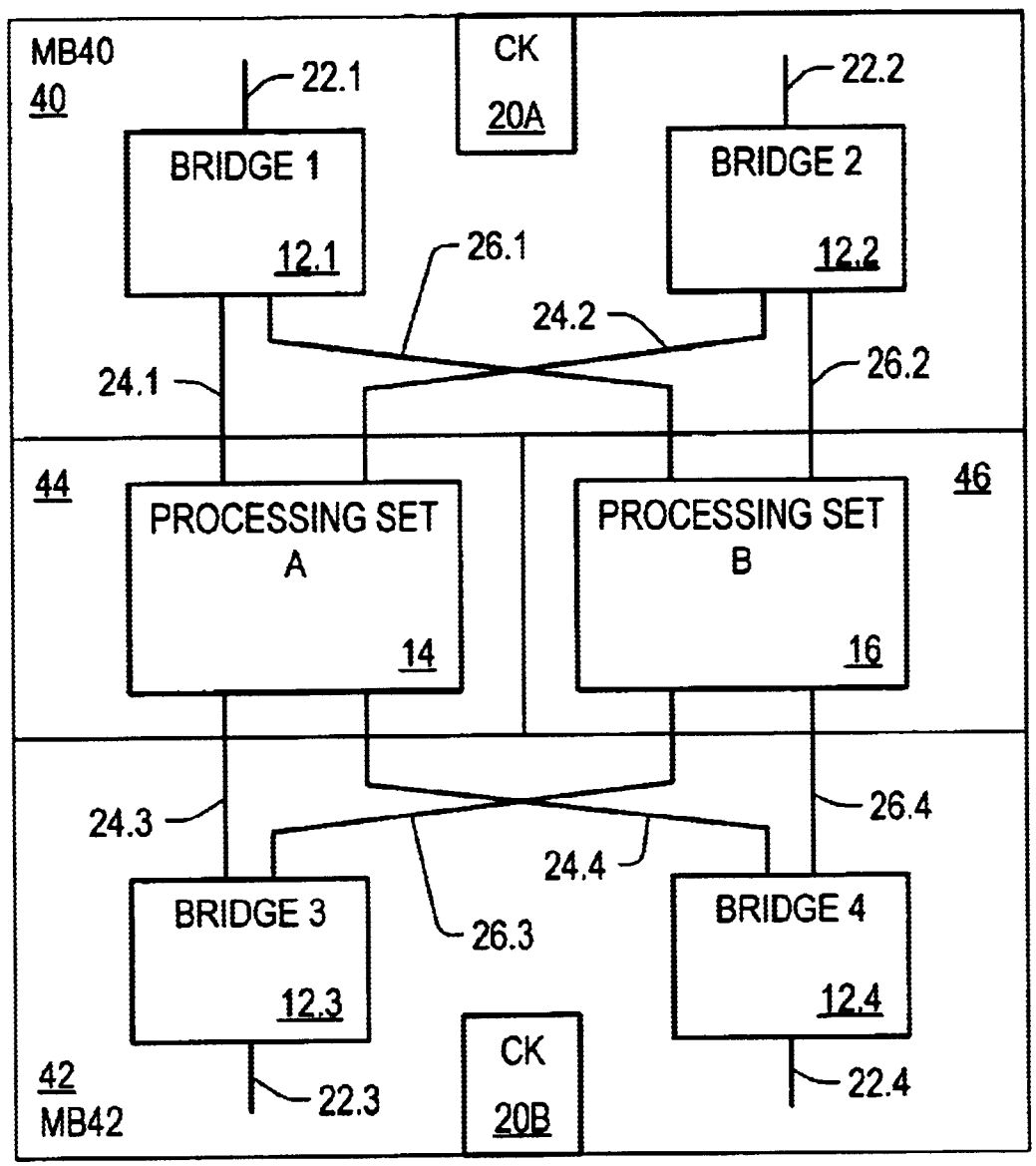
FIG. 2 is a schematic overview of a specific implementation of a system based on the architecture of FIG. 1.

FIG. 2 is a schematic overview of an implementation of a fault tolerant computer employing the approach illustrated in FIG. 1 In FIG. 2, the fault tolerant computer system includes a plurality of bridges 12 (here four) on first and second I/O motherboards (MB 40 and MB 42) order to increase the number of I/O devices that may be connected and also to improve reliability and redundancy. Thus, in the embodiment shown in FIG. 2, two processing sets 14 and 16 are each provided on a respective processing set board 44 and 46, with the processing set boards 44 and 46 'bridging' the I/O motherboards MB 40 and MB 42. A first, master clock source 20A is mounted on the first motherboard 40 and a second, slave, clock source 20B is mounted on the second motherboard 42. Clock signals are supplied to the processing set boards 44 and 46 via respective connections (not shown in FIG. 2).

First and seconds bridge 12.1 and 12.2 are mounted on the first I/O motherboard 40. The first bridge 12.1 is connected to the processing sets 14 and 16 by P buses 24.1 and 26.1, respectively. Similarly, the second bridge 12.2 is connected to the processing sets 14 and 16 by P buses 24.2 and 26.2, respectively. The bridge 12.1 is connected to an I/O databus (D bus) 22.1 and the bridge 12.2 is connected to an I/O databus (D bus) 22.2.

Third and fourth bridges 12.3 and 12.4 are mounted on the second I/O motherboard 42. The bridge 12.3 is connected to the processing sets 14 and 16 by P buses 24.3 and 26.3, respectively. Similarly, the bridge 4 is connected to the processing sets 14 and 16 by P buses 24.4 and 26.4, respectively. The bridge 12.3 is connected to an I/O databus (D bus) 22.3 and the bridge 12.4 is connected to an I/O databus (D bus) 22.4.

It can be seen that the arrangement shown in FIG. 2 can enable a large number of I/O devices to be connected to the two processing sets 14 and 16 via the D buses 22.1, 22.2, 22.3 and 22.4 for either increasing the range of I/O devices available, or providing a higher degree of redundancy, or both.

Figure 3:
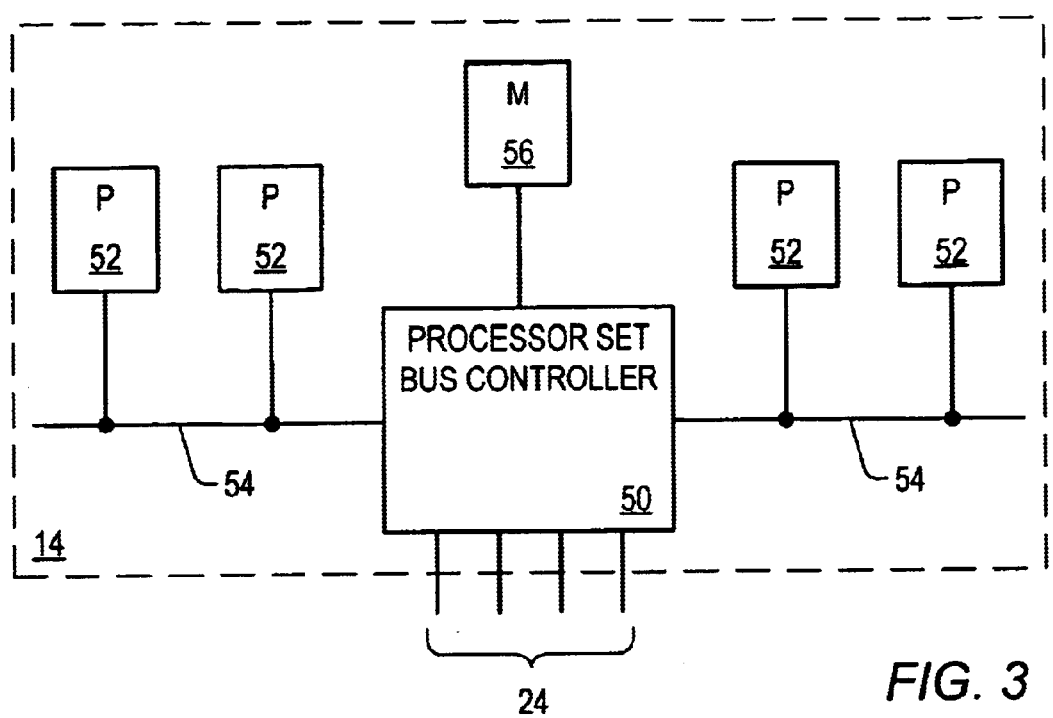
FIG. 3 is a schematic diagram of an example of a processing set.

FIG. 3 is a schematic overview of one possible configuration of a processing set, such as the processing set 14 of FIG. 1. The processing set 16 could have the same configuration. A plurality of processors (here four) 52 are connected by one or more buses 54 to a processing set bus controller 50. One or more processing set output buses 24 are connected to the processing set bus controller 50, each processing set output bus 24 being connected to a respective bridge 12. Individual processors operate using the common memory 56, and receive inputs and provide outputs on the common P bus(es) 24. It should be noted that the processing set may have many different forms and that the particular choice of a particular processing set structure can be made on the basis of the processing requirement of a particular application and the degree of redundancy required.

The bridges 12 are operable in a number of operating modes. In a first, combined mode, a bridge 12 routes addresses and data between the processing sets 14 and 16 ( via the PA and PB buses 24 and 26, respectively) and the devices (via the D bus 22). In this combined mode, I/O cycles generated by the processing sets 14 and 16 are compared to ensure that both processing sets are operating correctly. Comparison failures force a bridge 12 into an error limiting mode (EState) in which device I/O is prevented and diagnostic information is collected. In a second, split mode, the bridge 12 routes and arbitrates addresses and data from one of the processing sets 14 and 16 onto the D bus 22 and/or onto the other one of the processing sets 16 and 14, respectively. In this mode of operation, the processing sets 14 and 16 are not synchronized and no I/O comparisons are made. DMA operations are also permitted in both modes.

Figure 4:
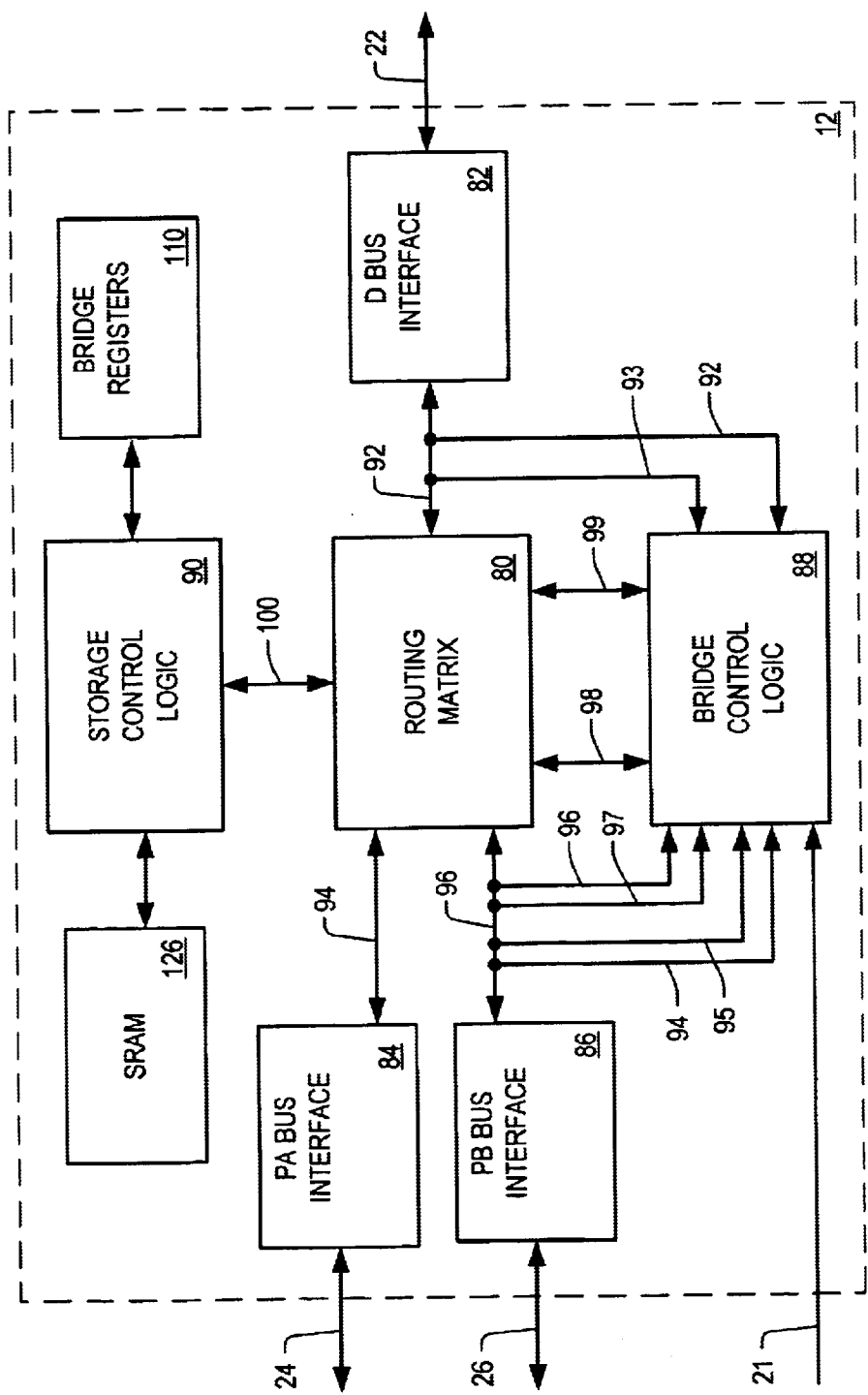
FIG. 4 is a schematic block diagram of an embodiment of a bridge for the system of FIG. 1.

FIG. 4 is schematic functional overview of the bridge 12 of FIG. 1.

First and second processing set I/O bus interfaces, PA bus interface 84 and PB bus interface 86, are connected to the PA and PB buses 24 and 26, respectively. A device I/O bus interface, D bus interface 82, is connected to the D bus 22. It should be noted that the PA, PB and D bus interfaces need not be configured as separate elements but could be incorporated in other elements of the bridge. Accordingly, within the context of this document, where a reference is made to a bus interface, this does not require the presence of a specific separate component, but rather the capability of the bridge to connected to the bus concerned, for example by means of physical or logical bridge connections for the lines of the buses concerned.

Routing (hereinafter termed a routing matrix) 80 connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide I/O bus transaction routing in both directions between the PA and PB bus interfaces 84 and 86. It is also able to provide routing in both directions between one or both of the PA and PB bus interfaces and the D bus interface 82. The routing matrix 80 is connected via a further internal path 100 to storage control logic 90. The storage control logic 90 controls access to bridges registers 110 and to a random access memory (SRM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In the present embodiment of the invention, each of the P buses (PA bus 24 and PB bus 26) operates under a PCI protocol. The processing set bus controllers 50 (see FIG. 3) also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an I/O error.

The device bus interface 82 performs all the functionality required for a PCI compliant master and slave interface for transferring data to and from one of the PA and PB buses 84 and 86. The D bus 82 is operable during direct memory access (DMA) transfers to provide diagnostic information to internal status registers in the storage subsystems 90 of the bridge on transition to an EState or on detection of an I/O error.

Figure 5:
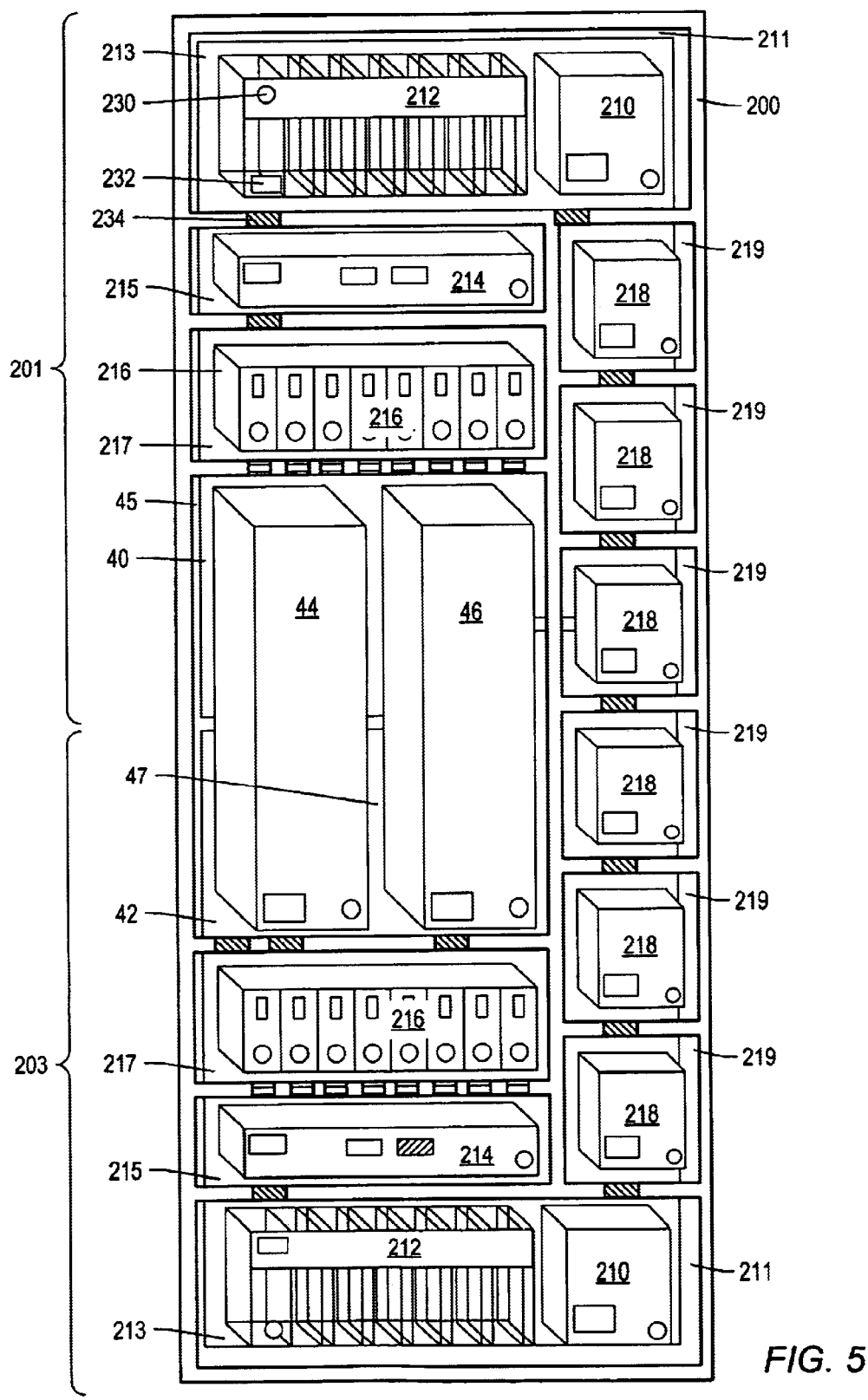
FIG. 5 is a schematic representation of a physical configuration of a computer system chassis with FRUs locatable in respective slots.

FIG. 5 is a schematic overview of a chassis 200 with the various slots for receiving field replaceable units (FRUs) including components, or devices, of the fault to tolerant computing system 10 described with reference to FIGS. 1 to 5. Each FRU may contain one or more devices.

Examples of the FRUs for use in the system include the two motherboard 40 and 42. These are mounted at locations 201 and 203 in the upper and lower portions of the chassis 200 as viewed in FIG. 5. The first and second processors sets 44 and 46, which also from FRUs, are mounted at locations 45 and 47 bridging the motherboards 40 and 42.

Other FRUs illustrated in FIG. 5 are Removable Media Module (RMM) FRUs 210, which are mounted in slots 211. Disk drive chassis FRUs 212 are mounted in slots 213. The disk drives in the disk drive chassis 212 are typically configured as FRUs. Console and Fan (CAF) FRUs 214, which include switches, ports, alarms and LEDs, are mounted in slots 215. PCI frame FRUs 216 are mounted in slots 217. The PCI cards in the PCI frame are also configured as FRUs. Power supply FRUs 218 are mounted in further slots 219. Sub-assemblies (not shown) of the power supply FRUs 218 could also be provided and be configured as FRUs.

The FRUs for insertion in the various slots are provided with an identification label (e.g., DSK) 232. A corresponding label (e.g., A-DSK) 234 is associated with each slot to indicate to the operator where each FRU is to be located. In an embodiment of the invention a FRU comprises a memory 230 (e.g., a non-volatile memory such as an EEPROM) for containing information relating to the FRU and the devices (s) it carries. As will be described later, this information inlcudes configuration management system class information for the FRU for use by a configuration management system (CMS) 400 (not shown in FIG. 6) to configure the FRU within the system. It should be noted that an embodiment of the invention may include, in addition to FRUs that include a memory 230, some units that are replaceable in the field, for example a disk drive, but which might not be provided with a memory 230. This may be desirable where, for reasons of economy, a conventional FRU is used.

The CMS models a hierarchy of the FRUs and the devices therein. The model defines a FRU tree with the FRUs being represented as nodes or objects in the tree to represent the physical dependency of the respective elements, including the dependency of the FRUs on one of the motherboards. For example, the CMS will model the PCI frames that supports PCI cards and the PCI cards therein.

The CMS also models a device hierarchy that is independent of the FRU hierarchy described above and the physical arrangement of the FRUs, as different devices can be on different FRUs. The CMS creates this device hierarchy from the class information, and possibly other information, read from non-volatile memory on the FRUs. The device hierarchy is represented as a device tree, various devices being shown as nodes, or objects in the tree. The CMS is able to use this tree to communicate with individual device drivers, and allows the CMS to model dependencies between the devices.

The CMS also models a service hierarchy. Service hierarchies can be defined with a service being represented as a node or object within a service hierarchy. A service can define, for example, a sub-system such as a fault tolerant core service. The services define system availability and are dependent on the devices of the system.

The combination of the FRU, device and service hierarchies form the configuration management system (CMS) model which is used to control the operation of the system. The model can be stored in the form of a database in a configuration file. The CMS uses this model to be able to support fault tolerance at a high level. It allows users to configure the various components of the system to carry out desired functions, and to oversee the functioning of the system.

Figure 6:
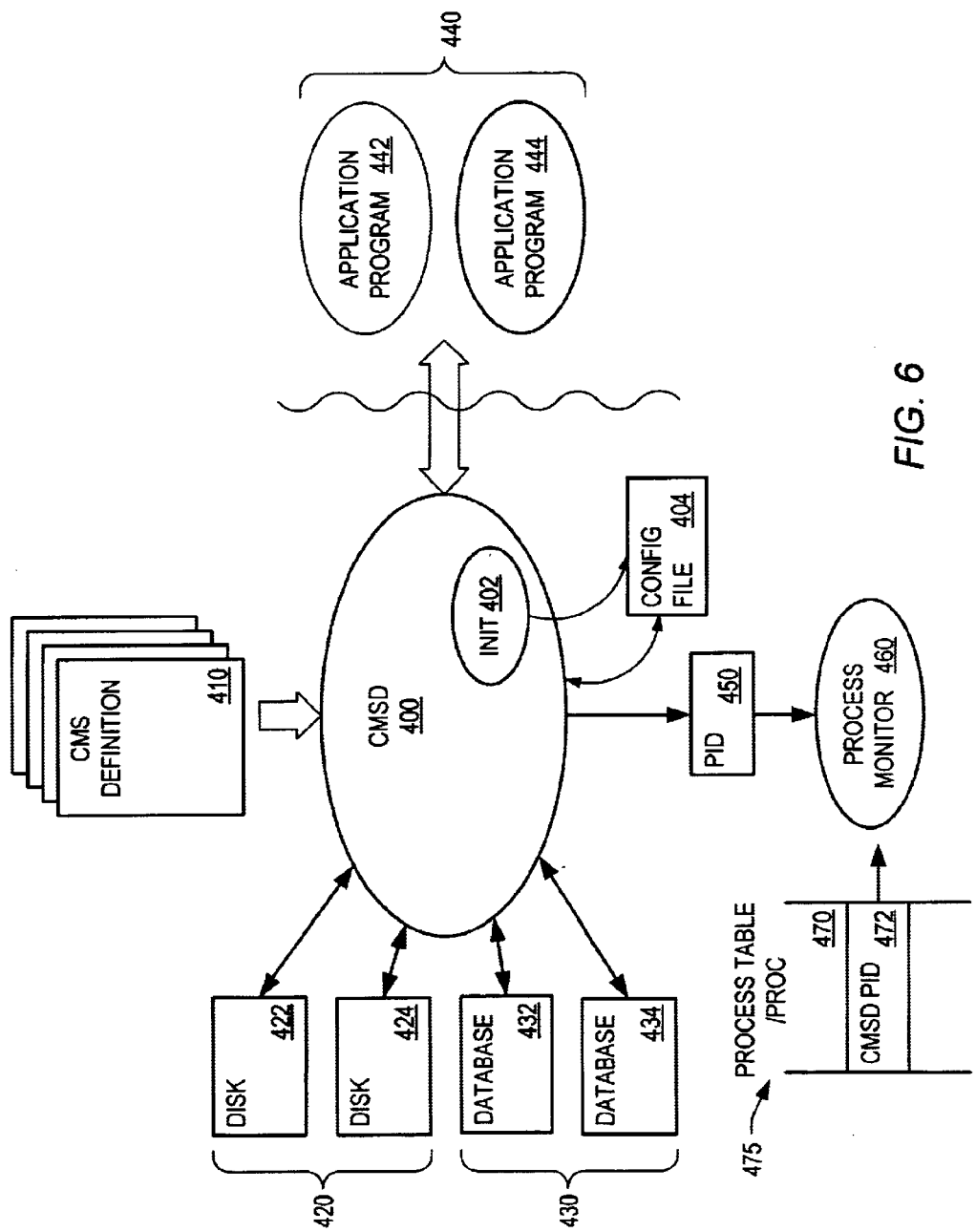
FIG. 6 illustrate the relationships between a configuration management system daemon and further components of the computer system.

FIG. 6 illustrates the relationship between a configuration management system daemon CMSD 400 and various components of the system. The CMSD 400 is a daemon for implementing the control management system of the computer system illustrated in the earlier Figures. A daemon is a background management process. Such a process may be available at any time from system initiation until shutdown.

The CMSD 400 manages various system entities (objects) which can be physical devices and/or software entities. The CMSD 400 is connected via a UNIX socket forming an application program interface (API) 446 to one or more application programs 440. In the present instance two application programs 442 and 444 are shown.

The behavior of the CMSD 400 is specified using CMS definitions (CMSDEFs) 410. The CMSDEFs include declaration for object that are managed by the CMSD 400, state evaluations (statements for evaluating the states of objects), and transition code that is executed when a transition occurs between the states of an object. The CMSDEFs 410 can be thought of as being similar to a set of state machines for the objects managed by the CMSD 400, with the CMSD 400 executing the state machines.

An initialization component 402 of the CMS is operative on a first initialization of the CMS to create a model of the system, including the FRU, device and service hierarchies, and stores this in a configuration file 404. The configuration file 404 forms a persistent copy of the model which can be used by the current invocation of the CMSD and on a subsequent re-boot or re-initialization of the system, assuming that the configuration has not changed or the configuration file has not been lost or damaged. The storage of the model in such a persistent manner can save initialization time as it is not necessary to go through the process of re-creating the model. It can also provide consistency between system initializations. As a result, in a fault tolerant system, it can enable better detection of faults where system elements have failed or changed between system initializations.

The CMSD 400 is operationally connected to various system entities that are managed by the CMSD 400. These entities can include physical devices 420 (for example disk drives 422 and 424) or software entities (for example databases 432 and 434). The CMSD 400 is associated with a unique processor identification (PID) 450, which the CMSD stores in a storage location, or file 452, known to a monitor process when the CMSD initiates successfully. The operation of the CMSD 400 is monitored by a process monitor 460 using the PID 450 stored by the CMSD 400 in the file 452. The process monitor 460 is configured as a monitor process (program) operable on the computer system. The monitor process 460 and the CMSD 400 are stored in the system memory of the processing sets and are executed by the processor(s) of the processing sets of the system. The file for the PID 450 can also be held in a system register or in memory.

The process monitor 460 is able to access the file 452 in order to determine the unique PID 450 for the CMSD 400. PID 450 is truly unique to the actual invocation of the CMSD 400, and is not to be confused with a simple name which could be associated with various versions of the CMSD 400, or even with another process or program masquerading as the CMSD 400. The process monitor 460 then uses the PID 450 from the file 452 to access status information identified by the PID 450 (at 472) in a process table (/proc) 470. The process table 470 can be held in a system register or in memory. The process table forms part of the resources of the operating system 475 of the computer system. The status information at location 472 in the process table 470 defines the current status of the CMSD 400, and, in particular, indicates whether it is currently active, and healthy, or whether it has died.

The CMSD 400 is normally started in the same way as any system daemon by a system process at system start-up. Following this, the process monitor 460 is then started. The process monitor is then able to monitor the CMSD 400 for failure of the CMSD 400. If the process monitor 460 detects failure of the CMSD 400, it initiates a restart of the CMSD 400.

As mentioned earlier, the CMSD 400 serves to provide high level fault tolerance monitoring for the fault tolerant computer system in that it models the interactions between the elements of the system and indeed manages the configuration of the system in response to user requirements. In order to be able to do this in an efficient manner, the component units and their constituent devices need to be configured in themselves and the computer system as a whole needs to be configured as regards, for example, the interactions between the units and/or the devices.

Figure 7:
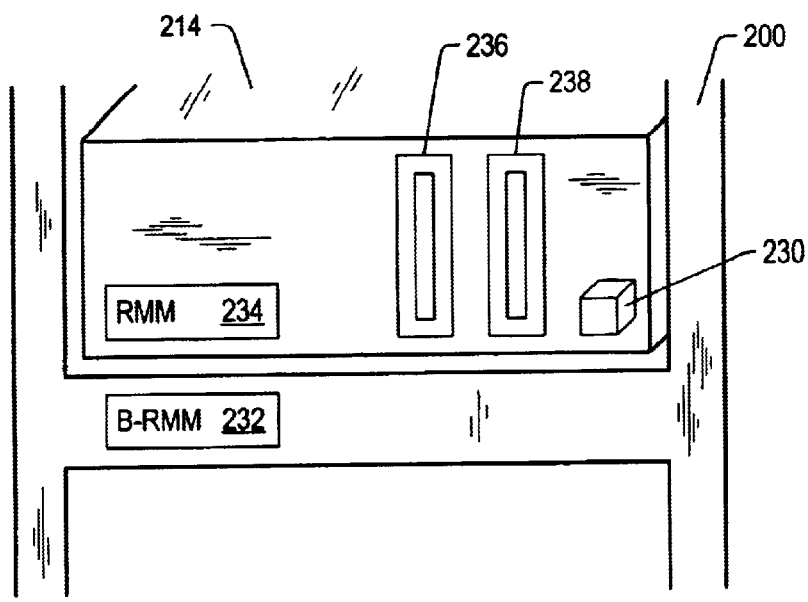
FIG. 7 is a schematic representation of a FRU in a chassis slot.

FIG. 7 illustrates a FRU 214, which is inserted in a slot 215 in the chassis 200. It can be seen that the FRU 214 carries a label 234 that can be matched to a label 232 adjacent to the slot 215 to assist in identification of the correct slot 215 for the FRU 214. As illustrated FIG. 7, the FRU 214 is an RMM FRU containing a tape drive 236 and a CD-ROM drive 238. The FRU 214 also includes a non-volatile memory 230 which contains configuration information to be used by the CMSD 400 in order correctly to configure the FRU 214 and its associated devices 236 and 238. The configuration information can include, for example, a part number and class information for the FRU. Other information is also provided as will be described later.

Figure 8:
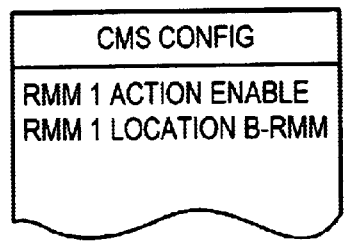
FIG. 8 represents a configuration file.

At initialization, the CMSD is operable to probe each slot, or FRU receiving location, of the chassis looking for the non-volatile memories 230. The class information for the FRU (here the FRU class name RMM) is used by the initialization component to derive a path to the CMS object definitions (CMSDEFs) for this class of FRU (here the RAM class). The CMSDEFs can include initialization code (initialization scripts) which are specific to the class of FRU and are operable on receipt of the FRU class and an instance number generated by the initialization component, to produce configuration information (configuration scripts) which are then stored in the CMS configuration file 404, which is held in system storage. If required, the initialization code can further access the FRU memory for further information needed to generate the initial configuration information. The configuration statements typically comprise an object class (e.g. RMM) and instance number (e.g. 1), and attribute (e.g. Action) and a value (e.g. enable). An example of entries in a CMS configuration file for the FRU 214 of FIG. 7 is illustrated in FIG. 8.

Figure 9:
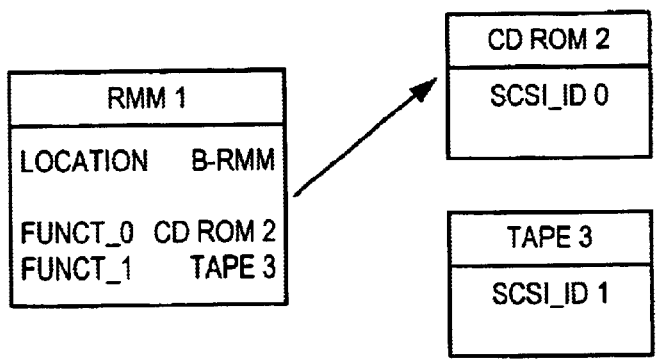
FIG. 9 represents an example of CMS DEFs and associated instances and attributes.

Once the CMS configuration table has been established and the initial checks have been completed, the CMSD is then able to establish which FRUs exist from the information stored in the CMS configuration file. In order correctly to set the device instances for the tape and CD ROM, the CMS "CMSDEFS" will further interrogate RMM FRU. The CMS model of the FRU and its devices are dynamically created from the information in the non-volatile memory 230. FIG. 9 illustrates an example of the CMSDEF's instances and attributes for the example FRU shown in FIG. 7.

The CMSD is operable automatically to generate at least the physical and device hierarchies by establishing links between the various objects in accordance with the information in the CMSDEFs, which includes declarations for objects managed by the CMSD, state evaluations (statements for evaluating the states of objects), and transition code that is executed when a transition occurs between the states of an object. The service hierarchy may be partially configured with operator intervention (e.g., to specify specific services as required by the user).

The process enables the creation of a database for providing a representative state for starting the CMSD.

The memory in the FRUs is used to store additional data other than that used specifically for the configuration process described above. For example, it is additionally used to store status information relating to the system operation, in order that the state of the system can be consistent across re-starts. Also it is used to store a history for the unit. This information can then be used off-line at some later stage, (for example on return of an allegedly faulty FRU) to establish whether it is the FRU or, perhaps, a slot in which it has been inserted, which is faulty.

A power distribution mechanism is described below that can safely power down the main FRU components in the event of a fault being detected. However, in order to be able to gain access to the memory in the FRU, the mechanism enables power to be supplied to the memory in the FRU even if the FRU itself has been powered down on the detection of a fault.

Figure 10:
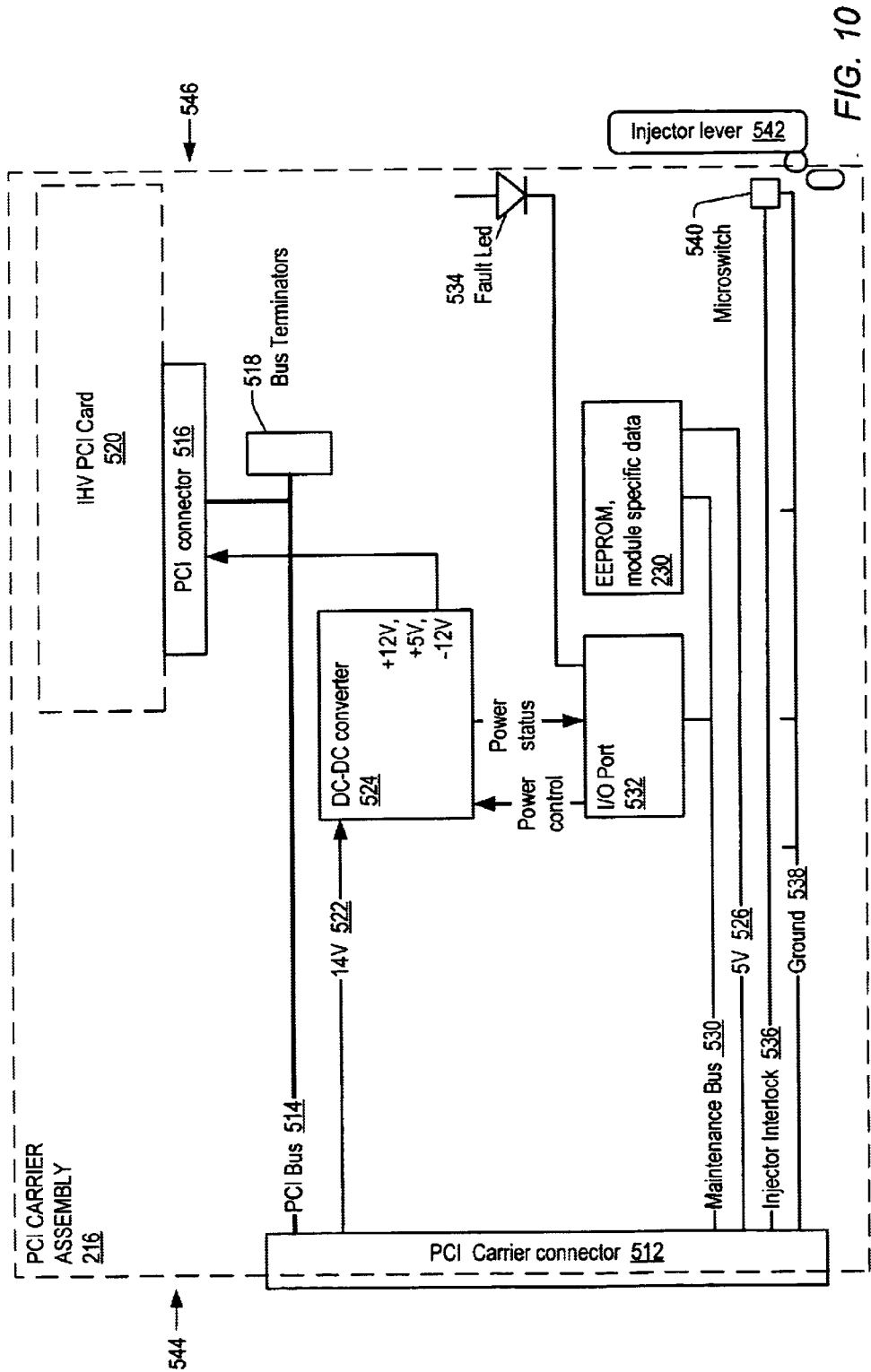
FIG. 10 is a schematic diagram of a FRU, here a PCI card carrier assembly.

FIG. 10 is a block diagram of a FRU 216 in the form of a PCI carrier assembly. The PCI carrier assembly 216 includes a PCI carrier connector 512 for connection to a distribution board of the computer system of FIG. 5. The PCI carrier connector 512 is connected to various electrical connections and signal pathways on the PCI carrier assembly 216.

A PCI connector 516 is connected to a PCI bus 514, which extends between the PCI caller connector 512 and bus terminators 518. A 14V power line 522 is provided between the PCI carrier connector 512 and a DC-DC converter 524 which provides secondary power conversion to generate a number of alternative power supplies (e.g., +12V, +5V and −12V) for powering different types of PCI cards. A PCI card 520 is shown, in dotted lines, inserted in the PCI connector 516. A separate 5V standby power line 526 is provided between the PCI carrier connectors 512 and an EEPROM 528 that provides the non-volatile memory 230 referred to above. A maintenance bus 530 extends between the PCI carrier connector 512 and the non-volatile memory 230 for reading (and possibly storing) data therein.

An I/O port 532 is also connected to the maintenance bus. The I/O port 532 allows power control to be passed from the maintenance bus 530 to the DC-DC converter 524, and allows power status information to be received from the DC-DC converter for passing to the maintenance bus 530. In the event of a fault, the I/O port is operable to light a fault light-emitting diode (LED) 534. The fault LED is provided at the end 546 of the PCI carrier assembly 216 opposite to the end 544 at which the PCI carrier connector 512 is located.

An injector interlock signal line 536 is provided between the PCI carrier connector 512 and the microswitch 540. The microswitch 540 is operated by means of an injector lever 542, which also provides securing of the PCI carrier assembly in the chassis 200 of the computer system shown in FIG. 4. A ground connection 538 also extends from the PCI carrier connector 512 to the various components on the PCI carrier assembly 216. The microswitch 540 is operable to connect the interlock signal line 536 to ground potential when closed. The microswitch 540 is closed when the injector lever 542 is closed and the PCI card is firmly locked in the chassis 200. When the microswitch 540 is opened when the injector lever 542 is also open and the PCI carrier assembly 216 is not locked in the chassis 200.

It will be noted that the non-volatile memory 230 is powered from the standby power line 526, which is separate from the main power line 522 that powers the main components of the PCI carrier assembly 216.

Figure 11:
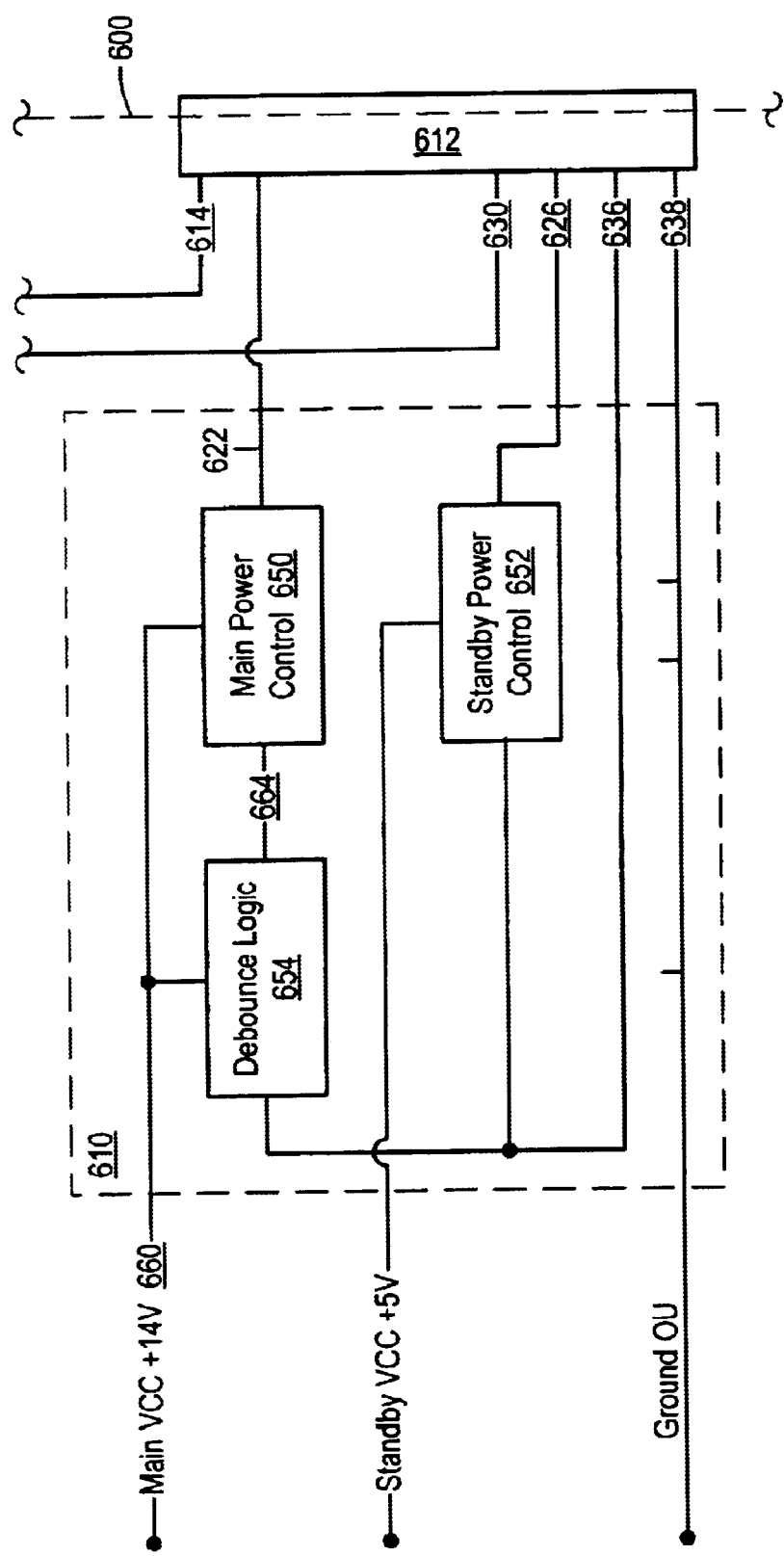
FIG. 11 is a schematic diagram of a power sub-system for supplying power to the FRU of FIG. 10.

FIG. 11 is a schematic representation of a power distribution module 610, which is implemented on a distribution card 600 that can, for example, form part of one of the I/O boards 40/42 shown in FIG. 2, or could be provided on a separate board. The power distribution module 610 includes a connector 612 for cooperating with the PCI carrier connector 512 of FIG. 10. Power and signal connection lines corresponding to those shown in FIG. 10 are also provided on the power distribution module 610.

Thus, a PCI bus 614 is connected to the PCI bus 512 on the PCI carrier assembly when the PCI carrier connector 512 is connected to the power distribution connector 612. A main power line 622 connects the distribution module connector 612 to main power control logic 650. The main power line 622 is connected to the main power line 522 on the PCI carrier assembly when the connectors 512 and 612 are connected to each other. A standby power line 626 connects the power distribution connector 612 to standby power control logic 652. The standby power line 626 is connected to the standby power line 526 on the PCI carrier assembly when the connectors 512 and 612 are connected to each other.

A maintenance bus 630 is also connected to the power distribution connector 612. This maintenance bus 630 connects to the maintenance bus 530 on the PCI carrier assembly when the connectors 512 and 612 are connected to each other. An interlock signal line 636 connects the power distribution connector 612 to the debounce logic 654 and to standby power control logic 652. The interlock signal line 636 is connected to the interlock signal line 536 of FIG. 10 when the connectors 512 and 612 are connected to each other. A ground line 638 connects the power distribution connector 612 to the various circuits 650, 654 and 652 of the power distribution module 610. The ground line 638 is connected to the ground line 538 shown in FIG. 10 when the connectors 512 and 612 are connected to each other.

The operation of the power distribution module 610 will be described in the following. When no PCI carrier connector 512 is connected to the power distribution connector 612, the main power control logic and the standby power control logic are operable such that power is not supplied to the main power line 622 and the standby power line 626, respectively. This is a result of no interlock signal being present in the interlock signal line 636 as will become apparent from the following description.

When a PCI carrier connector is inserted in the power distribution connector 612, and the injector lever 542 is closed, locking the PCI carrier assembly within the chassis 200, the microswitch 450 closes, connecting the interlock signal line 536 to ground. This causes a signal to be supplied to the standby power control 652 and to the debounce logic 654. As soon as the microswitch 540 closes, connecting the line 536 to ground, the standby power control logic 652 is operable to provide a standby voltage from line 662 (+5V) via the line 626, and the line 526 to the non-volatile memory 230. Main power is not immediately connected. However, after a short time determined by the debounce logic 654 (which is powered by the main power supply VCC 660 (e.g. 14V)), a debounced interlock signal 664 is supplied to the main power control logic 650. This signal causes the main power control logic 650 to supply the main power from the supply line 660 via the main power line 622 and 522 to the DC-DC converter 524. At this time, the main circuitry of the PCI carrier assembly is powered.

The main power control logic 650 is operable to sense the power supplied over the main power line 622 to detect any surges in the power supplied over that line. In the event of a power surge, that is an overcurrent, on the main power line 622, which may be indicative of a fault on the PCI carrier assembly 216, the main power control logic 650 is operative to cut power on the main power line 622. This does not, however, affect the supply of the standby power on standby power line 626 from the standby power control logic 652.

The main power control logic 650 is configured such that main power is only supplied again over main power line 622 following removal of the PCI carrier assembly 216 and reinsertion of a PCI carrier assembly 216. Accordingly, the main power control logic 650 requires the removal of the injector interlock signal from line 536 (the ground connection is removed from the interlock signal line 536 by opening of the microswitch 540 in response to opening of the injector lever 542), followed by reinstatement of the interlock signal 536 (the ground connection is reestablished by closing of the microswitch 540 in response to closing of an injector lever 542 of the replacement PCI carrier assembly).

Figure 12:
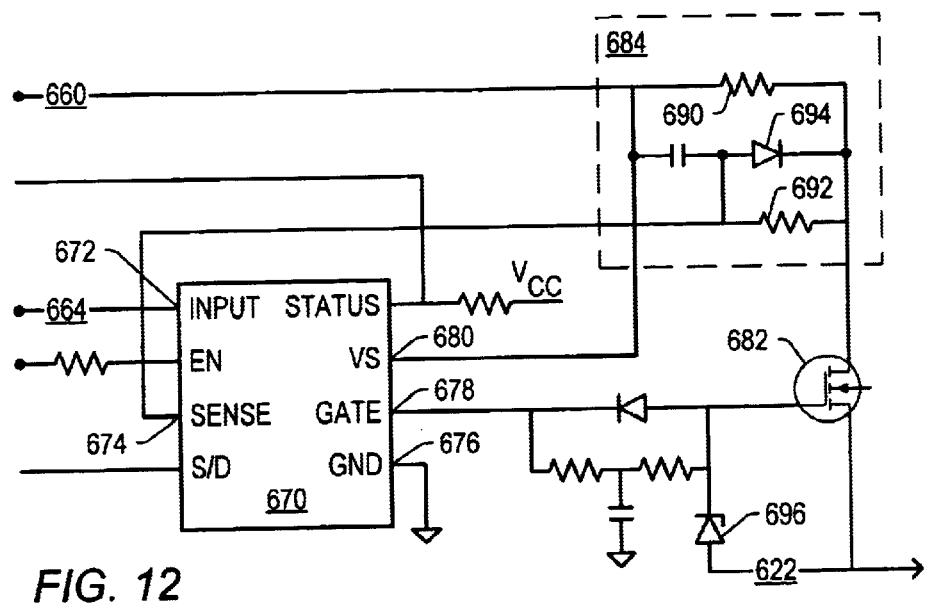
FIG. 12 is a circuit diagram of main power control logic of FIG. 11.

FIG. 12 is a circuit diagram of main power control logic 650. This shows a power switch 682 in the form of a semiconductor device (here an N-channel field effect transistor), and a switch control circuit 670 for controlling the power switch 682. The switch control circuit 670 includes an input 672 connected to the debounced interlock signal line 664, a power input 680 connected to the main power line 660, a gate output 678 connected to a gate of the switch 682, a ground connection 676 connected to ground and a sense input 674 connected to a power overload sensing circuit 684. The switch control circuit 670 also includes enable, shut down and status connections that are not relevant to an understanding of the present invention.

In operation, the overload sensing circuit 684 is operable to sense a significant change in the current supply demanded by the PCI carrier assembly 216 of FIG. 10. Resistors 690 and 692 define a voltage divider of the sensor circuit and the diode 690 senses an inrush current as an overcurrent fault signal. The rectifier 696 defines a clamp voltage for the transistor switch 682. The overcurrent fault signal (i.e. a signal indicative of an overcurrent being sensed) is received at the sense input 674 of the switch control circuit 670 and is operable to remove the signal output from the gate circuit 678, turning off the switch 682, and cutting the main power supply via the line 622 to the main power line 522 of the PCI carrier assembly 216. The switch control circuit 670 is responsive to removal of the debounced interlock signal on line 664 followed by the return of the interlock signal on the debounced interlock signal line 664 to reinstate a switch output at 678 causing the switch 682 to once more supply main power to the main power line 522 of the PCI carries assembly 216. As mentioned above, the debounced interlock signal 664 corresponds to placing the input 672 at ground potential. The logic implemented by the switch control logic 670 is illustrated below with respect to the flow diagram of FIG. 15. Any suitable implementation of the control logic 670, whether hardware gates, or software code, can be used according to a selected embodiment.

Although, in the present embodiment, sensor circuitry is provided for detecting an overcurrent in other embodiments one or more sensors for detecting one or more other fault conditions (such as, by way of examples, and overvoltage, and undervoltage, an excess temperature) could be provided in addition or instead of the overload sensing circuitry for detecting an overcurrent.

Figure 13:
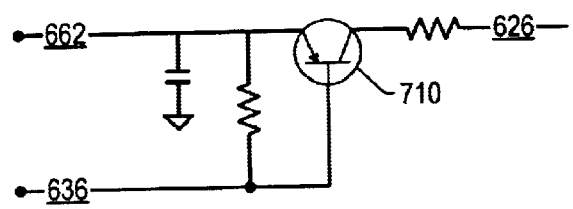
FIG. 13 is a circuit diagram of standby power control logic of FIG. 11.

FIG. 13 is a circuit diagram for the standby power control logic 652. With the standby power control logic 652, standby power is provided on standby power line 626 from the standby power supply line 662 when the semiconductor switch (herea transistor switch) 710 is closed in response to an interlock signal supplied on line 636. The interlock signal on line 636 is supplied directly to the standby power control logic 652. Thus, it does not pass via the debounce logic 654. Accordingly, at any time when the PCI carrier assembly is located in the chassis with the PCI carrier connector 512 connected to the power distribution connector 612, and with the injector lever 542 closed, which in turn closes the microswitch 540, standby power is provided to the non-volatile memory 230. This supply of standby power to the non-volatile memory 230 is irrespective of whether main power is supplied to the main PCI carrier assembly circuitry, that is irrespective of whether there is a fault, or not.

The debounce logic 654 is provided to ensure that the logic employed in restoring main power is not inadvertently operated in response to transient interlock signals on the line 536 relating, for example, to bouncing of the microswitch 540.

Figure 14:
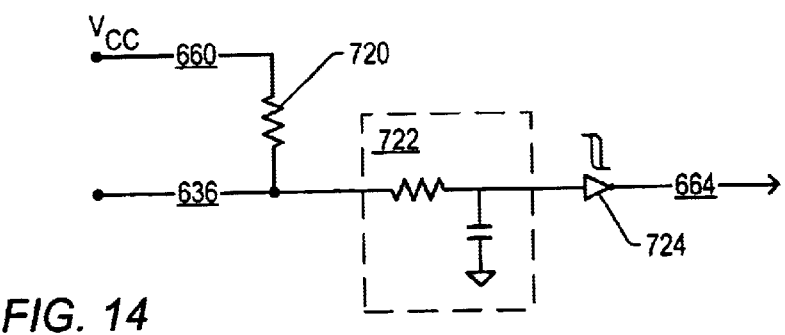
FIG. 14 is a circuit diagram of the debounce logic of FIG. 11.

FIG. 14 is a representation of debounce logic 654, which essentially comprises a pull up resistor 720, an RC delay circuit 722 with a Schmitt trigger 724 for controlling the transition between a floating potential when the interlock signal line 536/636 is not grounded and ground potential when the interlock signal line 536/636 is grounded. The RC delay circuit 722 and the Schmitt trigger 724 have the effect of preventing a very rapid change in the interlock signal resulting from switch bounce, for example, causing incorrect triggering of the main power control logic, while still providing for a positive signal change between a situation where the interlock signal line 536/636 is grounded via the microswitch 540 and a situation where it is a floating potential under the effect of the pull-up resistor 720.

Figure 15:
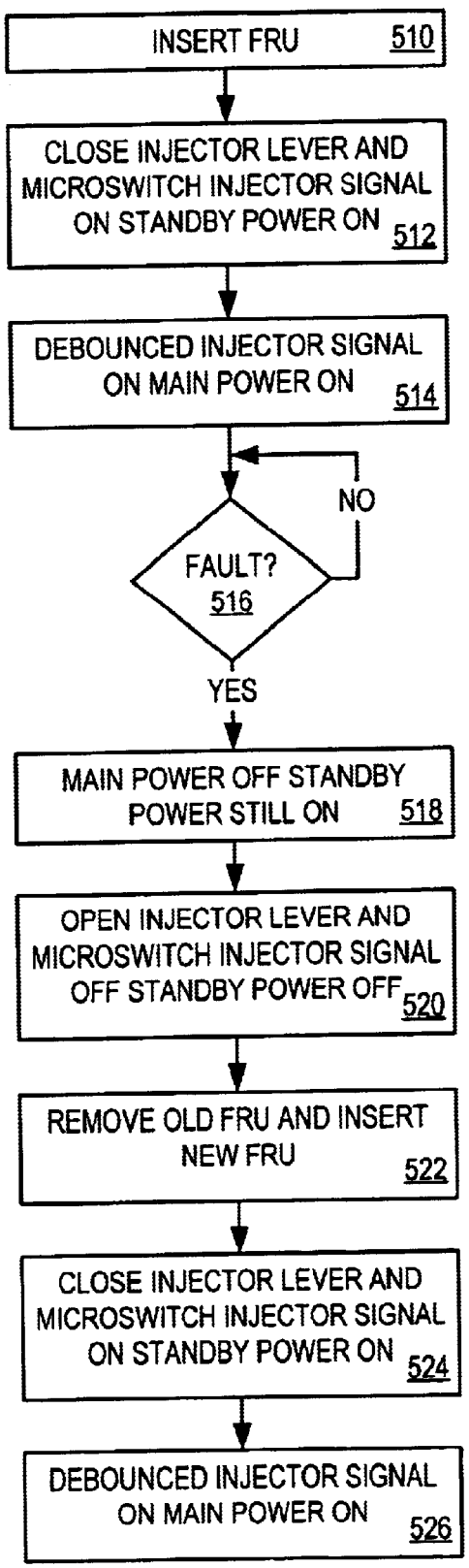
FIG. 15 is a flow diagram illustrating power control operations.

FIG. 15 is a flow diagram illustrating the logic involved in initially applying power to the main power line 622/522, removal of the main power in the event of a fault, and reinstatement of main power following a fault and replacement of a PCI carrier assembly. This sets out the logic employed by the main power control logic 650 and the standby power control logic 652 and the debounce logic 654.

Thus, in Step S10, the PCI carrier assembly 216 is inserted and connection is made between the connectors 512 and 612.

In Step S12, on closing the injector lever 542, the microswitch 540 closes, grounding the interlock signal line 536. This provides an interlock signal, which causes standby power to be provided by the standby power control logic 652. The interlock signal on lines 536/636 is also passed to the debounce logic 654.

In Step S14, after a time determined by the debounce logic 654, the debounced interlock signal 664 also passes to ground, causing main power to be supplied on line 622 by the main power control logic 650. It is assumed that normal operation of the PCI carrier assembly is then possible. In normal operation, normal connections to the PCI card can be achieved via the PCI bus 514, with the PCI card 520 being powered by the DC-DC power converter 524, which provides power at an appropriate voltage.

If, in Step S16, a fault is detected by the sense circuitry 684, then in Step S18, main power is disabled by the main power control logic 650. This is in response to the power control circuit 670 receiving a signal at the sense input indicative of, for example, a power surge. Disabling of main power does not, however, cause standby power to be removed. Thus, following Step S18, it is no longer possible to operate with the PCI card, as main power on line 522 in FIG. 10 has been removed. However, it is still possible to access the non-volatile memory 230 via the maintenance bus 530, as standby power on line 526 is still supplied via line 626 from the standby power control logic 652.

It should be noted that the sort of fault which could be detected in S16 can relate to a fault within the PCI carrier assembly itself, or alternatively a fault in the connection between the connectors 512 and 612. Thus, for example, if individual connectors were broken, bent or bad connections of the individual connection lines to the connectors were made, whereby a short circuit occurred, this could be detected by the fault sense circuit 684 of the main power control logic 650.

Accordingly, even in a powered down condition, of the FRU, it is possible for the CMS to interrogate details of the faulty PCI carrier assembly, including the FRU identification data, and also any history (e.g., fault history) data logged in the non-volatile memory 230. Optionally, the CMS can also be configured to write to, where appropriate, the non-volatile memory 230.

Subsequently, in Step S20, a maintenance engineer will remove the PCI carrier assembly 216 from the chassis 200. This will involve opening the injector lever 542, which in turn opens the microswitch 540. This results in the interlock signal line 536 no longer being tied to ground, whereby the removal of the interlock signal can be detected by the switch control circuit 670 of the main power control logic 650 via the debounce logic 652. The standby power control logic 652 is also responsive to removal of the interlock signal on opening the microswitch 540 to cut the supply of standby power on line 626/526 to the non-volatile memory 230.

In Step S22, a new PCI carrier assembly 216 is inserted into the chassis 200 by the maintenance engineer. After making connection between the connectors 512 and 612, the engineer closes the injector lever 542 to mechanically lock the PCI carrier assembly 216 in the chassis 200. This also causes closing of the microswitch 540, causing the interlock signal to be supplied on line 536 by tying the potential of that line to ground.

The interlock signal is detected by the standby power control logic 652, causing standby power to be supplied once more by line 626 and 526 to the non-volatile memory 230. The interlock signal is also detected on line 636 by the debounce logic 654.

In Step S24, after the time determined by the debounce logic 654, the debounced interlock signal 664 once more goes to zero. This is detected by the switched control circuit 670 of the main power control logic 650, causing power to be restored on line 622 for supply via line 522 to the DC-DC converter of the PCI carrier assembly 216.

Figure 16:
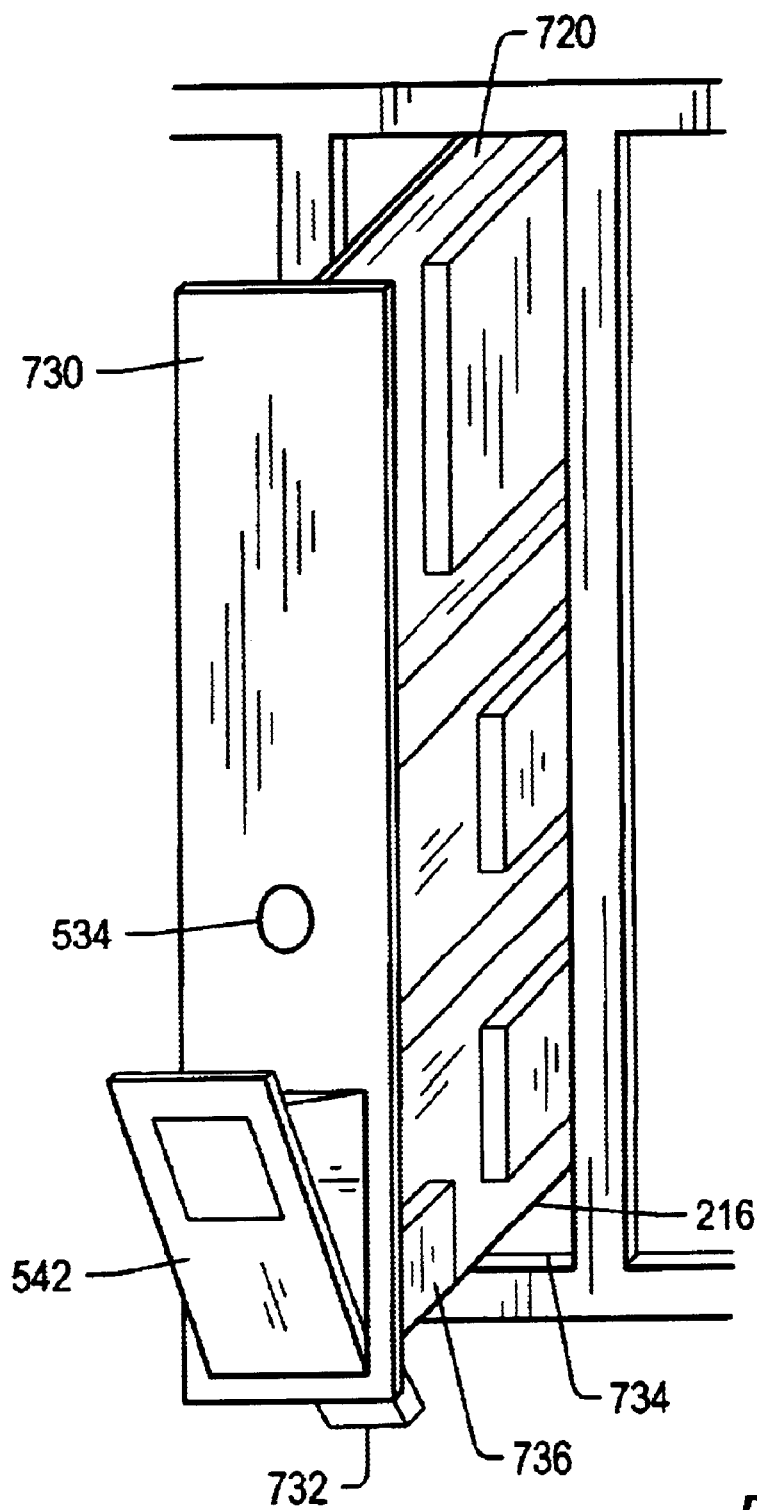
FIG. 16 is a representation of the FRU of FIG. 10 and showing an injector interlock lever of a FRU.

FIG. 16 is a perspective end view of a PCI carrier assembly 216. It can be seen that, in the present embodiment, the PCI carrier assembly includes a board 720 carrying the various components and an end plate 730 which is provided at the outer end 546 of the PCI carrier assembly 216, that is the end opposite to that at which the PCI carrier connector 512 is located. The end plate 730 carries the fault LED 534 and also carries the injector lever 542. The injector lever 542 is provided with a mechanical latching portion 732 that engages behind a portion 734 of the chassis 200. The microswitch 540 is contained in housing 734 and is operated on closing the injector lever 542 (i.e., the position where the lever 542 becomes flush with the surface of the end plate 730 and the latching portion 732 engages behind the chassis portion 734).

As will be appreciated from the above, power off and power on control can be effected on a power distribution plane, for example on a motherboard of the system, in response to mechanical operations of an injector interlock lever on the FRU. The described arrangement provides both reliable fault detection and reliable powering off and on during FRU removal and FRU insertion operations. Both the fault detection and the powering off and on is effected automatically.

Security and safety is enhanced when hot swapping FRUs as a result of the automatic powering down and powering up of the FRU in the event of a fault associated with the FRU and during the FRU removal and FRU insertion processes. Moreover, the provision of a separate power feed to the memory in the FRU that is used to hold configured and status data for the FRU means that remote access for monitoring and processing fault and status histories and for on-going configuration tasks can be performed even when the main FRU components have been powered down following a fault.

The present invention has been described in the context of a PCI carrier assembly for use in a fault tolerant computer system as shown in FIG. 4. It will be appreciated, however, that the present invention could be applied to any other FRU for use in the computer system shown in FIG. 4, or indeed in any FRU for use in any computer or other electronic equipment which requires the advantages of the present invention. Also, although an example of the invention has been described in the context of a fault tolerant computing system, it is not limited in its application to such a system.

It will be appreciated that although particular embodiments of the invention have been described, many modifications/additions and/or substitutions may be made within the spirit and scope of the present invention as defined in the appended claims. Accordingly, the particular example described is intended to be illustrative only, and not limitative.

I claim:

1. A power sub-system for controlling a supply of power to a field replaceable unit for electronic equipment, the power sub-system comprising:
   a sensor circuit responsive to a fault, to provide a signal indicative thereof; and
   a power controller comprising power control logic responsive to the detection of a fault signal, to switch off the supply of power to a field replaceable unit; and subsequently, in response to a first change in state of an interlock signal indicative of the field replaceable unit being released, followed by a second change of state of the interlock signal indicative of a field replaceable unit being secured in position, to switch on the supply of power to the field replaceable unit.

2. The power sub-system of claim 1, wherein the sensor circuit is responsive to a overcurrent on the power line to provide a signal indicative thereof.

3. The power sub-system of claim 1, comprising a semiconductor switch controlled by the power controller for switching on and off the supply of power to a power line to the field replaceable unit.

4. The power sub-system of claim 1, comprising an interlock signal line that carries an interlock signal when the field replaceable unit is locked in the electronic equipment.

5. The power sub-system of claim 4, wherein interlock signal is a predetermined potential on the interlock signal line.

6. The power sub-system of claim 5, wherein first change in state is the removal of the predetermined potential and the second change of state is the reinstatement of the predetermined potential.

7. The power sub-system of claim 5, wherein the predetermined potential is ground potential.

8. The power sub-system of claim 1, comprising debounce logic connected between the interlock signal line and power controller for debouncing the interlock signal.

9. The power sub-system of claim 1, comprising a connector arrangement for connecting a plurality of power and signal lines to a corresponding plurality of power and signal lines of the field replaceable unit.

10. The power sub-system of claim 1, wherein the power control logic comprises a logic circuit.

11. Electronic equipment including a power sub-system for controlling the supply of power to a field replaceable unit, the power sub-system comprising:
    a sensor circuit responsive to a fault, to provide a signal indicative thereof; and a power controller comprising power control logic responsive to the detection of a fault signal, to switch off a supply of power to a field replaceable unit; and subsequently, in response to a first change in state of an interlock signal indicative of the field replaceable unit being released, followed by a second change of state of the interlock signal indicative of a field replaceable unit being secured in position, to switch on the supply of power to the field replaceable unit.

12. The electronic equipment of claim 11, comprising a computer system, the field replaceable unit being a computer system component.

13. The electronic equipment of claim 12, wherein the computer system is a rack-mounted computer system.

14. The electronic equipment of claim 12, wherein the computer system is a fault-tolerant computer system.

15. The electronic equipment of claim 11, further comprising a field replaceable unit, the field replaceable unit including an interlock mechanism for locking the field replaceable unit in the electronic equipment, an interlock switch operated by the interlock mechanism and an interlock signal line, the interlock switch connecting the interlock line to a source of a predetermined potential when the interlock mechanism locks the field replaceable unit in the electronic equipment.

16. The electronic equipment of claim 15, wherein the predetermined potential is ground potential.

17. The electronic equipment of claim 11, wherein the field replaceable unit is a PCI card carrier assembly.

18. The electronic equipment of claim 17, wherein the field replaceable unit comprises power conversion circuitry for supplying different voltages to a connectable PCI card.

19. The electronic equipment of claim 11, wherein the power sub-system and the field replaceable unit comprise co-operating connector arrangements for interconnecting a plurality of power and signal lines of the power sub-system to a corresponding plurality of power and signal lines of the field replaceable unit.

20. A field replaceable unit for connection to a power sub-system of electronic equipment, the power sub-system comprising:

a sensor circuit responsive to a fault, to provide a signal indicative thereof; and a power controller comprising power control logic responsive to the detection of a fault signal, to switch off the supply of power to the field replaceable unit, the field replaceable unit including an interlock mechanism for locking the field replaceable unit in the electronic equipment, an interlock switch operated by the interlock mechanism and an interlock signal line, the interlock switch connecting the interlock line to a source of a predetermined potential when the interlock mechanism locks the field replaceable unit in the electronic equipment.

21. The field replaceable unit of claim 20, wherein the predetermined potential is ground potential.

22. The field replaceable unit of claim 20, wherein the field replaceable unit is a PCI card carrier assembly.

23. The field replaceable unit of claim 20, comprising power conversion circuitry for supplying different voltages to a connectable PCI card.

24. The field replaceable unit of claim 20, comprising a connector arrangement for interconnecting a plurality of power and signal lines of the field replaceable unit to a corresponding plurality of power and signal lines of the power sub-system.

25. A method of controlling a supply power to a field replaceable unit for electronic equipment, the method comprising:

providing a sensor circuit responsive to a fault, to provide a signal indicative thereof and a power controller comprising power control logic responsive to the detection of a fault signal;

to switch off the supply of power to a field replaceable unit; and subsequently, in response to a first change in state of an interlock signal indicative of the field replaceable unit being released, followed by a second change of state of the interlock signal indicative of a field replaceable unit being secured in position, to switch on the supply of power to the field replaceable unit.

26. The method of claim 25, wherein the sensor circuit is responsive to an overcurrent on a power line to provide a signal indicative thereof.

27. The method of claim 25, wherein the interlock signal is in a predetermined state when the field replaceable unit is locked in the electronic equipment.

28. The method of claim 25, wherein the first change of state is the removal of a predetermined potential and the second change of state is the reinstatement of the predetermined potential.

29. The method of claim 28, wherein the predetermined potential is ground potential.

30. The method of claim 29, wherein the interlock signal is debounced.

31. The method of claim 25, wherein the field replaceable unit is locked in position in the electronic equipment using an interlock mechanism, an interlock switch being operated by the interlock mechanism to supply an interlock signal to an interlock signal line.

32. The method of claim 31, wherein the interlock switch connects the interlock line to a source of a predetermined potential when the interlock mechanism locks the field replaceable unit in the electronic equipment.

* * * * *